(12) United States Patent
Nomura et al.

(10) Patent No.: US 11,352,007 B2
(45) Date of Patent: Jun. 7, 2022

(54) BRAKE/DRIVE FORCE CONTROL SYSTEM

(71) Applicant: TOYOTA JIDOSHA KABUSHIKI KAISHA, Toyota (JP)

(72) Inventors: Shin Nomura, Seto (JP); Yoshihide Nakane, Okazaki (JP); Takeshi Inoguchi, Chiryu (JP); Tomonori Nonami, Toyota (JP); Makoto Hirose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/225,294

(22) Filed: Apr. 8, 2021

(65) Prior Publication Data
US 2021/0221372 A1 Jul. 22, 2021

Related U.S. Application Data

(63) Continuation of application No. 16/722,208, filed on Dec. 20, 2019, now Pat. No. 10,994,733.

(30) Foreign Application Priority Data

Jan. 31, 2019 (JP) .............................. JP2019-015584

(51) Int. Cl.
*B60W 30/18* (2012.01)
*B60W 10/06* (2006.01)
*B60W 10/18* (2012.01)

(52) U.S. Cl.
CPC ...... *B60W 30/18009* (2013.01); *B60W 10/06* (2013.01); *B60W 10/18* (2013.01); *B60W 2710/0616* (2013.01); *B60W 2710/18* (2013.01)

(58) Field of Classification Search
CPC ................. B60W 10/06; B60W 10/18; B60W 30/18009; B60W 30/18136;
(Continued)

(56) References Cited

U.S. PATENT DOCUMENTS 5,431,242 A * 7/1995 Iwata ..................... B60K 28/16
701/87
6,104,976 A 8/2000 Nakamura
(Continued)

FOREIGN PATENT DOCUMENTS

JP  H11-227592 A  8/1999
JP  2016-061179 A  4/2016

OTHER PUBLICATIONS

U.S. Appl. No. 16/722,208, filed Dec. 20, 2019 in the name of Nomura et al.

*Primary Examiner* — Edwin A Young
(74) *Attorney, Agent, or Firm* — Oliff PLC

(57) ABSTRACT

A brake/drive force control system includes: a requested acceleration calculating section; a powertrain control section calculating a minimum brake/drive force at the time of no fuel cut and a fuel-cut brake/drive force, generating larger one of a requested brake/drive force and the minimum brake/drive force when the requested brake/drive force is larger than the fuel-cut brake/drive force, and generating the fuel-cut brake/drive force when the requested brake/drive force is equal to or smaller than the fuel-cut brake/drive force; a brake control section generating a requested brake force; and a brake/drive force control section calculating the requested brake/drive force from requested acceleration, requesting the powertrain control section for the requested brake/drive force, acquiring the brake/drive force generated by a powertrain, and when the requested brake/drive force is smaller than the acquired brake/drive force, requesting the
(Continued)

brake control section for a difference between the requested brake/drive force and the acquired brake/drive force.

10 Claims, 5 Drawing Sheets

(58) Field of Classification Search
CPC ..... B60W 2710/0616; B60W 2710/18; B60W 2720/10
See application file for complete search history.

(56) References Cited

U.S. PATENT DOCUMENTS

| | | |
|---|---|---|
| 2003/0098185 A1 | 5/2003 | Komeda et al. |
| 2015/0298704 A1* | 10/2015 | Itagaki ................. B60W 10/06 180/65.265 |
| 2016/0318514 A1 | 11/2016 | Kuwahara et al. |
| 2017/0113695 A1 | 4/2017 | Kim et al. |

* cited by examiner

FIG. 3
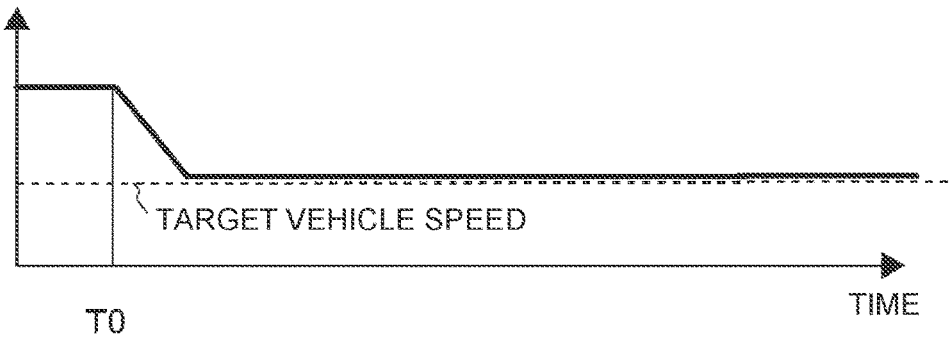
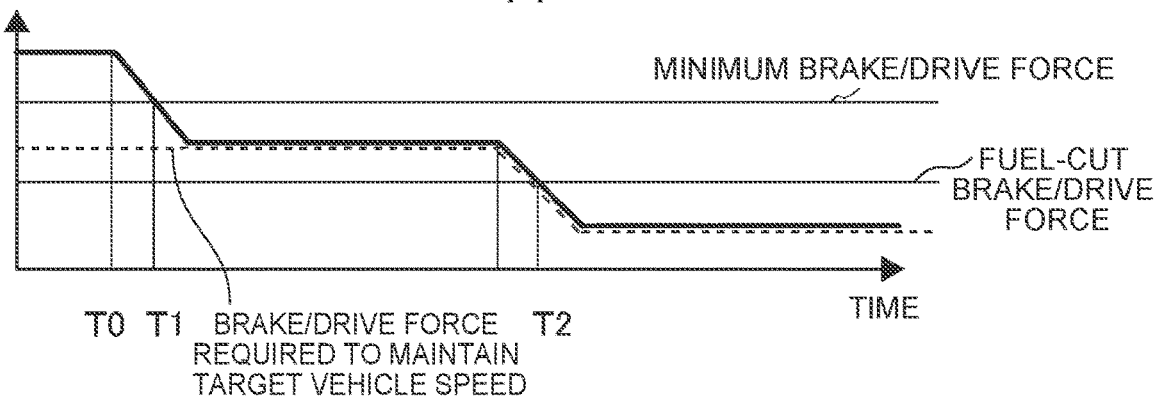
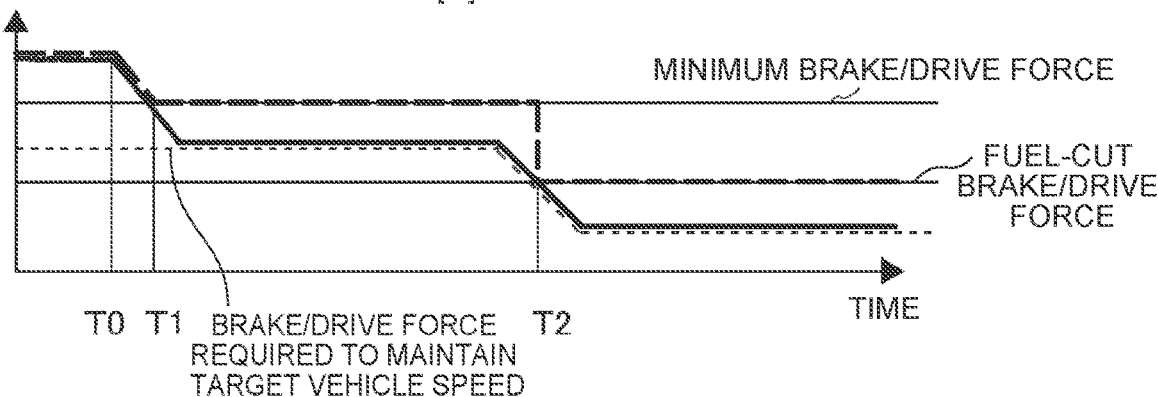

FIG. 5
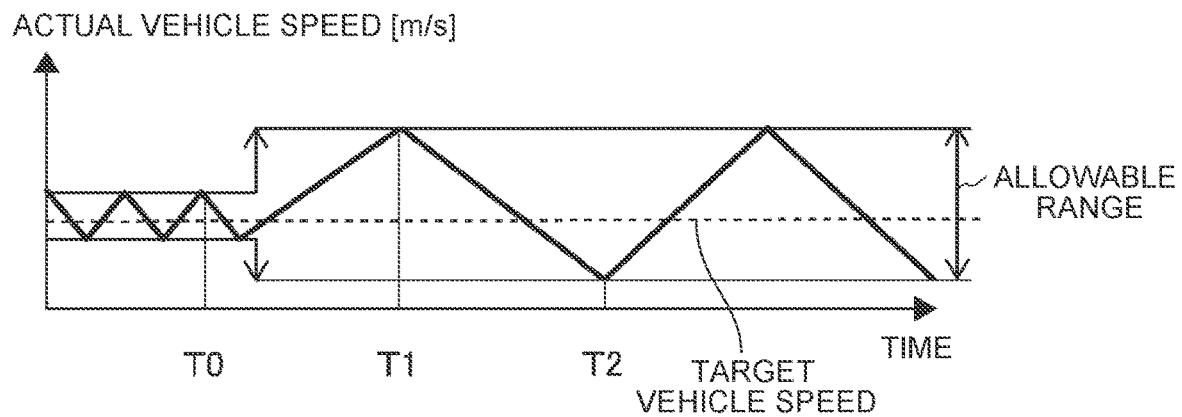
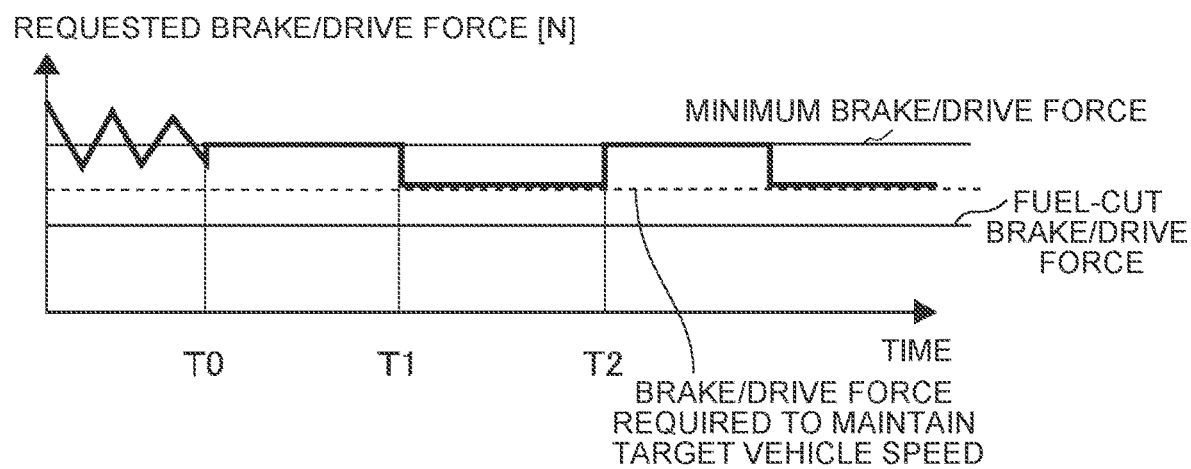
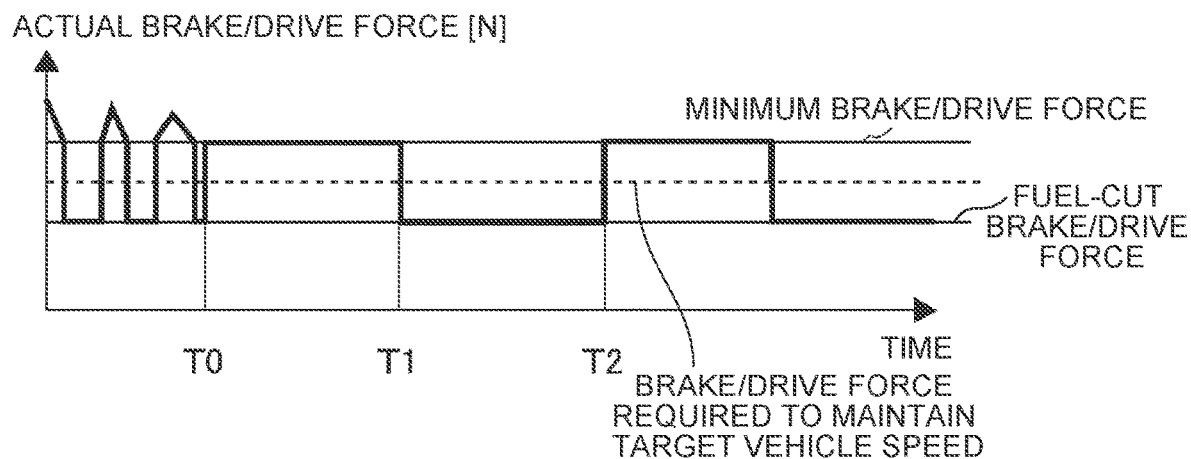

BRAKE/DRIVE FORCE CONTROL SYSTEM

This is a continuation application of U.S. patent application Ser. No. 16/722,208, filed Dec. 20, 2019, which claims priority to Japanese Patent Application No. 2019-015584 filed on Jan. 31, 2019. The entire disclosure of each of the above applications including the specification, drawings and abstract is incorporated herein by reference in its entirety.

BACKGROUND

1. Technical Field

The disclosure relates to a brake/drive force control system that is mounted on a vehicle to control a brake/drive force of the vehicle.

2. Description of Related Art

On vehicles in recent years, a driver assistance system that is referred to as adaptive cruise control (ACC), an adjustable speed limiter (ASL), a cruise control system (CRC), or the like and has a function of automatically maintaining a vehicle speed is mounted. Such a driver assistance system generates and outputs an instruction to achieve and maintain a target vehicle speed on the basis of information that is acquired from a camera, a vehicle speed sensor, and the like. With such an instruction, a powertrain and a brake are controlled, which causes the powertrain to generate a brake/drive force that is either a brake force or a drive force and the brake to generate the brake force. As a result, the target vehicle speed is achieved and maintained.

In the case where a positive direction of the brake/drive force is set to an advancing direction of the vehicle and, for example, the vehicle maintains the constant vehicle speed while traveling on a downhill road, the powertrain is requested to reduce the brake/drive force, and thus engine braking is expected. When the brake/drive force requested to the powertrain becomes smaller than the brake/drive force that can only be achieved with an engine fuel cut, a fuel cut occurs. When the fuel cut occurs, the brake/drive force generated by the powertrain is reduced discontinuously, falls below the brake/drive force requested to the powertrain. As a result, the vehicle is decelerated. Meanwhile, when the brake/drive force requested to the powertrain is increased to accelerate the vehicle, the fuel cut no longer occurs. However, cancellation of the fuel cut leads to generation of the brake/drive force that is larger than the brake/drive force requested to the powertrain. Just as described, in the case where the constant vehicle speed is maintained on the downhill road or the like, the execution and the cancellation of the fuel cut are repeated, which possibly causes hunting in which the brake/drive force generated by the powertrain is abruptly reduced or increased between a fuel-cut brake force, which is the brake force during the execution of the fuel cut, and a minimum brake/drive force, which is the minimum brake/drive force at the time of no fuel cut. As a result, ride quality is possibly degraded.

In Japanese Patent Application Publication No. 2016-61179 (JP 2016-61179 A), it is disclosed to prohibit the fuel cut in the case where the occurrence of the hunting is detected during control for causing the powertrain to generate the requested brake/drive force that is requested to maintain the target vehicle speed.

SUMMARY

A description will be made on a problem of a method for suppressing hunting with reference to FIG. 5. Such a method is executed when it is desired to maintain the target vehicle speed. In the method, when the hunting is detected as described above, the fuel cut is suppressed, so as to suppress the hunting. FIG. 5 includes graphs that have time in a horizontal axis and have, on a vertical axis, an actual vehicle speed, the requested brake/drive force to the power train, and an actual brake/drive force generated by the powertrain. The above-described hunting occurs until time T0. After the hunting is detected, the fuel cut is suppressed between the time T0 and T1, and thus the hunting can be suppressed. However, in this period, since the actual brake/drive force is larger than the requested brake/drive force, the vehicle speed is increased. In order to suppress deviation of the actual vehicle speed from the target vehicle speed, the fuel cut is executed between the time T1 and T2 so as to decelerate the vehicle. Thereafter, the execution and the cancellation of the fuel cut is repeated. Just as described, simply suppressing the fuel cut to suppress the hunting substantially means to extend cycles of the execution and the cancellation of the fuel cut by increasing an allowable range of the deviation of the actual vehicle speed from the target vehicle speed. In addition, suppressing the fuel cut through the detection of the hunting means that the hunting, which occurs firstly, cannot be avoided. Thus, there is still room for improvement in pursuance of the target vehicle speed and in the ride quality.

The disclosure has been made in view of the above problem, and therefore has a purpose of providing a brake/drive force control system capable of achieving preferred pursuance of a target vehicle speed and preferred ride quality in control for generating a brake/drive force in a vehicle in order to maintain the target vehicle speed.

In order to solve the above problem, an aspect of the disclosure is a brake/drive force control system that controls a brake/drive force to be generated by a powertrain including an engine and a brake force to be generated by a brake, so as to maintain a target vehicle speed. The brake/drive force control system includes: a requested acceleration calculating section that calculates requested acceleration as acceleration generated in the vehicle to maintain the target vehicle speed; a powertrain control section that calculates a minimum brake/drive force, which is a minimum brake/drive force capable of being generated by the powertrain without executing a fuel cut of the engine, and a fuel-cut brake/drive force, which is the brake/drive force generated by the powertrain through execution of the fuel cut, accepts a request to generate the brake/drive force, causes the powertrain to generate larger one of the requested brake/drive force and the minimum brake/drive force when the requested brake/drive force is larger than the fuel-cut brake/drive force, and causes the powertrain to generate the fuel-cut brake/drive force when the requested brake/drive force is equal to or smaller than the fuel-cut brake/drive force; a brake control section that accepts a request to generate the brake force and causes the brake to generate the requested brake force; and a brake/drive force control section that requests the powertrain control section for the brake/drive force and requests the brake control section for the brake force on the basis of the requested acceleration. The brake/drive force control section includes: a brake/drive force calculating section that calculates the requested brake/drive force acquired by converting the requested acceleration to a force; and a brake/drive force distributing section that requests the powertrain control section for the requested brake/drive force, acquires the brake/drive force that is generated by the powertrain in response to the request, and requests the brake control section for the brake force corresponding to a difference between the requested brake/drive force and the acquired brake/drive force when the requested brake/drive force is smaller than the acquired brake/drive force.

In order to solve the above problem, another aspect of the disclosure is a brake/drive force control system that controls a brake/drive force to be generated by a powertrain including an engine and a brake force to be generated by a brake, so as to maintain a target vehicle speed. The brake/drive force control system includes: a requested acceleration calculating section that calculates requested acceleration as acceleration generated in the vehicle to maintain the target vehicle speed; a powertrain control section that calculates a minimum brake/drive force, which is a minimum brake/drive force capable of being generated by the powertrain without executing a fuel cut of the engine, and a fuel-cut brake/drive force, which is the brake/drive force generated by the powertrain through execution of the fuel cut, accepts a request to generate the brake/drive force, and causes generation of the requested brake/drive force; a brake control section that accepts a request to generate the brake force and causes the brake to generate the requested brake force; and a brake/drive force control section that requests the powertrain control section for the brake/drive force and requests the brake control section for the brake force on the basis of the requested acceleration. The brake/drive force control section includes: a brake/drive force calculating section that calculates the requested brake/drive force acquired by converting the requested acceleration to a force; and a brake/drive force distributing section that acquires the minimum brake/drive force and the fuel-cut brake/drive force, when the requested brake/drive force is equal to or larger than the minimum brake/drive force, requests the powertrain control section for the requested brake/drive force, when the requested brake/drive force is smaller than the minimum brake/drive force and is larger than the fuel-cut brake/drive force, requests the powertrain for the minimum brake/drive force, and requests the brake control section for the brake force corresponding to a difference between the requested brake/drive force and the minimum brake/drive force, and when the requested brake/drive force is equal to or smaller than the fuel-cut brake/drive force, requests the powertrain for the fuel-cut brake/drive force, and requests the brake control section for the brake force corresponding to a difference between the requested brake/drive force and the fuel-cut brake/drive force.

The disclosure can provide the brake/drive force control system capable of achieving preferred pursuance of the target vehicle speed and preferred ride quality in the control for generating the brake/drive force in the vehicle in order to maintain the target vehicle speed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 includes graphs illustrating the processing according to the first and second embodiments of the disclosure;

FIG. 5 includes graphs illustrating processing according to the related art.

DETAILED DESCRIPTION OF EMBODIMENTS (First Embodiment) A brake/drive force control system according to a first embodiment of the disclosure suppresses a fuel cut in the case where a requested brake/drive force is smaller than a brake/drive force generated by a powertrain at the time of no fuel cut, but is larger than the brake/drive force generated by the powertrain during execution of the fuel cut. In addition, in the case where the brake/drive force in such a range that cannot be generated only by the powertrain is requested at the time of no fuel cut and during the execution of the fuel cut, a brake is made to generate a brake force, so as to match the brake/drive force generated in the vehicle with the requested brake/drive force. In this way, the preferred pursuance to a target vehicle speed and preferred ride quality without an abrupt change in the brake/drive force can be achieved. A detailed description will hereinafter be made on this embodiment with reference to the drawings.

Figure 1:
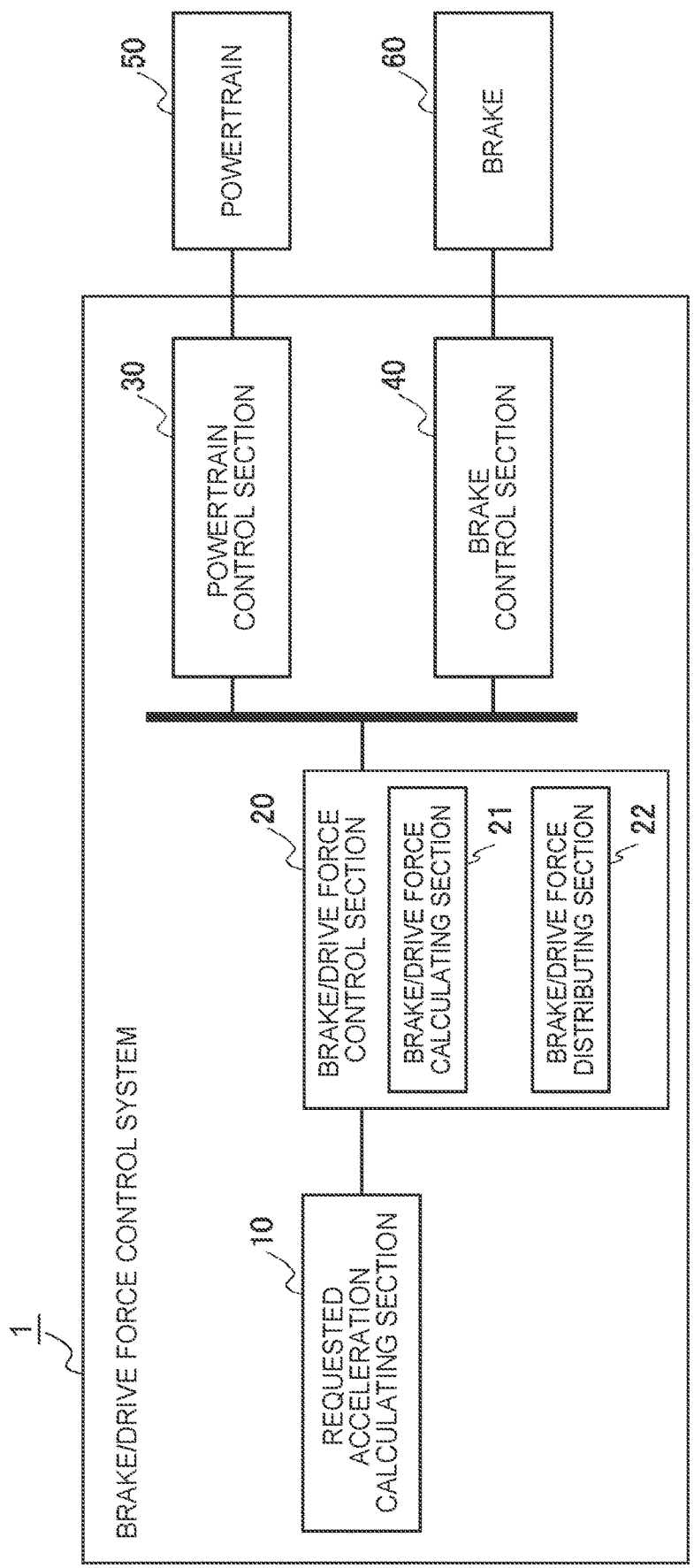
FIG. 1 is a functional block diagram of a brake/drive force control system according to first and second embodiments of the disclosure.

<Configuration> FIG. 1 is a functional block diagram of a brake/drive force control system 1 according to this embodiment and peripheral equipment. The brake/drive force control system 1 includes a requested acceleration calculating section 10, a brake/drive force control section 20, a powertrain control section 30 that controls a powertrain 50, and a brake control section 40 that controls a brake 60.

The requested acceleration calculating section 10 is provided in a driver assistance system, such as ACC, that has a function of achieving and maintaining the target vehicle speed. On the basis of information that is acquired from a vehicle speed sensor, a camera, and the like and indicates a vehicle state and a peripheral state of the vehicle and information that is set in advance, the requested acceleration calculating section 10 sets the target vehicle speed and calculates, as control information for achieving and maintaining the target vehicle speed, requested acceleration that is acceleration generated by the vehicle.

The brake/drive force control section 20 includes a brake/drive force calculating section 21 and a brake/drive force distributing section 22. The brake/drive force calculating section 21 accepts the above-described requested acceleration as a request from the requested acceleration calculating section 10, converts the requested acceleration to a force to be generated in the vehicle, and calculates a requested brake/drive force. The requested brake/drive force is represented by a value, a positive direction of which is set to an advancing direction of the vehicle, for example. The requested brake/drive force can be calculated on the basis of the requested acceleration and vehicle weight that is set in advance, for example. In addition, when calculating the requested brake/drive force, the brake/drive force calculating section 21 may also calculate feedback that is based on an actual vehicle speed acquired from the vehicle speed sensor or the like, correction that is based on an inclination of a road surface and the like acquired from various sensors, and the like. On the basis of the requested brake/drive force, the brake/drive force distributing section 22 requests the powertrain control section 30 for the brake/drive force that is either the brake force or the drive force, and further possibly requests the brake control section 40 for the brake force.

The powertrain control section 30 controls the powertrain 50 provided in the vehicle, and thus can generate the brake/drive force. The powertrain 50 has an engine. When generating the brake force, the powertrain 50 executes an engine fuel cut according to various states of the powertrain 50, such as an engine temperature, and a value of the brake force. In addition, the powertrain control section 30 monitors the various states of the powertrain 50, and can calculate a minimum brake/drive force and a fuel-cut brake/drive force. The minimum brake/drive force is a minimum brake/drive force that can currently be generated by the powertrain 50 without executing the fuel cut. The fuel-cut brake/drive force is generated when the powertrain 50 currently executes the fuel cut. When generating the brake/drive force that is equal to or larger than the minimum brake/drive force, the powertrain 50 does not execute the fuel cut. When generating the fuel-cut brake/drive force, the powertrain 50 executes the fuel cut.

The brake control section 40 controls the brake 60 provided in the vehicle, and thus can generate the brake force.

Figure 2:
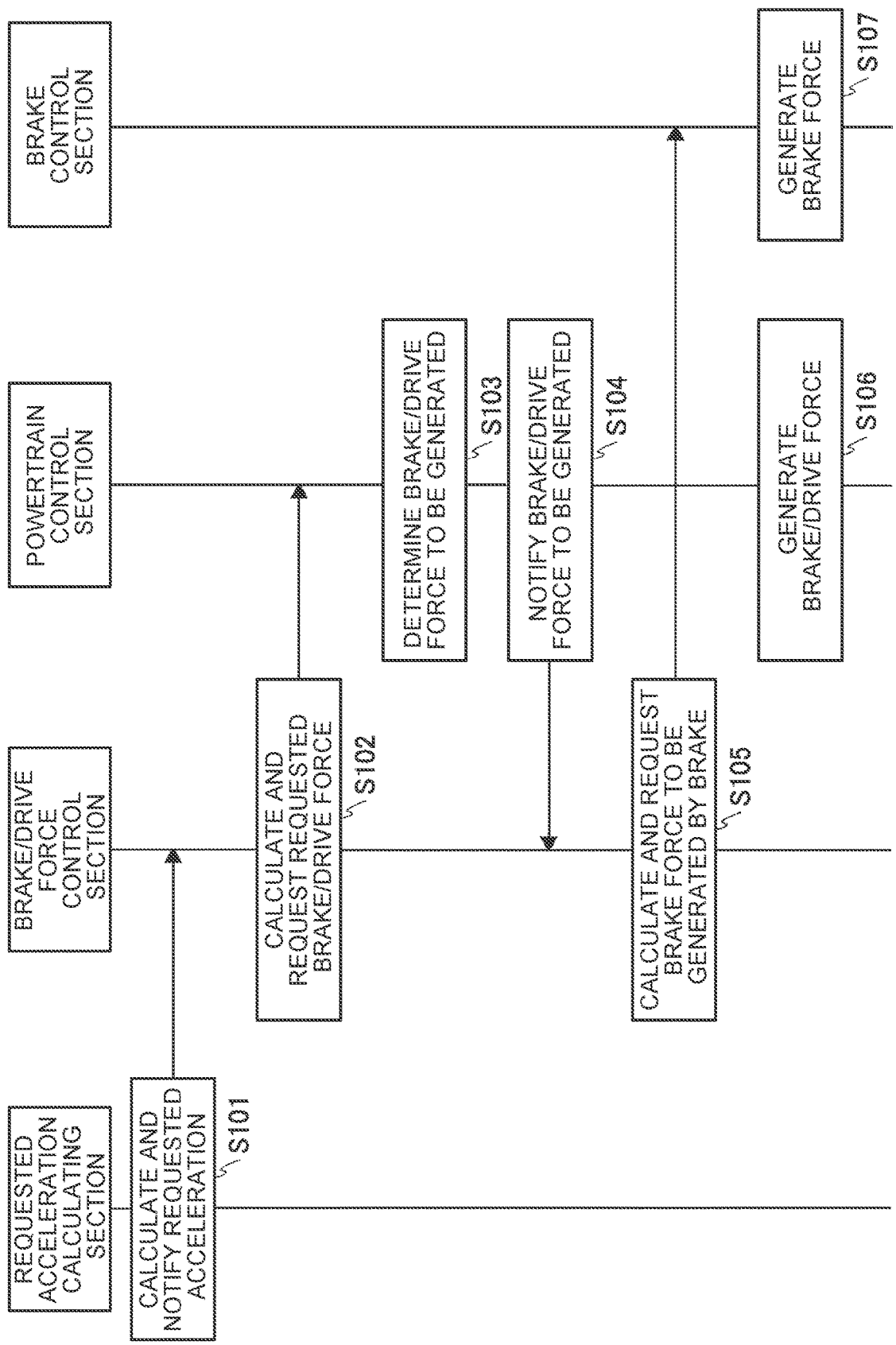
FIG. 2 is a sequence chart illustrating processing according to the first embodiment of the disclosure.

<Processing> FIG. 2 is a sequence chart illustrating an example of brake/drive force control processing executed by the brake/drive force control system 1. A description will be made on the example of the brake/drive force control processing with reference to FIG. 2. A flow illustrated in FIG. 2 is repeatedly executed during execution of a driver assistance function such as the ACC.

(Step S101): The requested acceleration calculating section 10 calculates the requested acceleration as described above. In addition, the requested acceleration calculating section 10 notifies the brake/drive force control section 20 of the requested acceleration.

(Step S102): The brake/drive force calculating section 21 of the brake/drive force control section 20 accepts the requested acceleration notified in step S101, and calculates the requested brake/drive force as described above on the basis of the requested acceleration. In addition, the brake/drive force distributing section 22 of the brake/drive force control section 20 requests the powertrain control section 30 to generate the requested brake/drive force.

(Step S103): The powertrain control section 30 accepts the requested brake/drive force requested in step S102, and determines the brake/drive force to be generated by the powertrain 50 on the basis of the requested brake/drive force as follows. First, the powertrain control section 30 calculates the minimum brake/drive force and the fuel-cut brake/drive force described above.

(1-1) When the requested brake/drive force is larger than the fuel-cut brake/drive force: the powertrain control section 30 causes the powertrain 50 to generate larger one of the requested brake/drive force and the minimum brake/drive force. In this case, the powertrain 50 does not execute the fuel cut.

(1-2) When the requested brake/drive force is equal to or smaller than the fuel-cut brake/drive force: the powertrain control section 30 causes the powertrain 50 to generate the fuel-cut brake/drive force. In this case, the powertrain 50 executes the fuel cut as a result.

As described so far, the brake/drive force generated by the powertrain 50 is equal to the requested brake/drive force or larger than the requested brake/drive force. That is, in the case where the requested brake/drive force is small and the brake force is further requested, the brake force generated by the powertrain 50 is possibly insufficient for the requested brake/drive force.

(Step S104): The powertrain control section 30 notifies the brake/drive force control section 20 of the brake/drive force to be generated by the powertrain 50 that is determined in step S103.

(Step S105): The brake/drive force distributing section 22 of the brake/drive force control section 20 determines the brake force to be generated by the brake 60 on the basis of the requested brake/drive force and the brake/drive force to be generated by the powertrain 50, which is notified in step S104, as follows.

(1-3) When the requested brake/drive force is smaller than the brake/drive force to be generated by the powertrain 50: the brake/drive force distributing section 22 requests the brake control section 40 for the brake force that corresponds to a difference between the requested brake/drive force and the brake/drive force to be generated by the powertrain 50. That is, in the case where the requested brake/drive force is small and thus the brake force is further requested, and the sufficient requested brake/drive force cannot be generated only by the powertrain 50, the brake is actuated to compensate for shortage of the brake force.

(1-4) When the requested brake/drive force is equal to the brake/drive force to be generated by the powertrain 50: the brake/drive force distributing section 22 does not request the brake control section 40 to generate the brake force. Alternatively, the brake/drive force distributing section 22 requests the brake control section 40 for 0 (N) as the brake force.

The powertrain control section 30 may acquire a range of the brake force, which can currently be generated by the brake, from the brake control section 40, and may determine the requested brake force to the brake control section 40 within the acquired range. For example, in (1-3) described above, in the case where an absolute value of the brake force corresponding to the difference between the requested brake/drive force and the brake/drive force to be generated by the powertrain 50 exceeds a maximum value of an absolute value of the brake force that can currently be generated by the brake, the brake/drive force distributing section 22 may request the brake control section 40 for the brake force corresponding to such a maximum value.

(Step S106): The powertrain control section 30 causes the powertrain 50 to generate the brake/drive force determined in step S103.

(Step S107): When being requested to generate the brake force from the brake/drive force control section 20 in step S105, the brake control section 40 causes the brake 60 to generate the requested brake force.

The processing in steps S101 to S107 described so far is repeatedly executed. A description will be made on an example of the brake/drive force control by the above processing with reference to FIG. 3. FIG. 3 includes graphs that have time in a horizontal axis and have, on a vertical axis, an actual vehicle speed, the requested brake/drive force, and an actual brake/drive force. The actual brake/drive force generated by the powertrain 50 is indicated by a bold broken line, and a total of the actual brake/drive force generated by the powertrain 50 and the actual brake force generated by the brake 60 is indicated by a bold solid line.

In the example illustrated in FIG. 3, the above processing is initiated at time T0. In order to achieve the target vehicle speed, the requested brake/drive force is gradually reduced, and at time T1, the requested brake/drive force becomes equal to the minimum brake/drive force. Thereafter, the requested brake/drive force becomes smaller than the minimum brake/drive force, at time T2, becomes equal to the fuel-cut brake/drive force, and then becomes smaller than the minimum brake/drive force. In FIG. 3, the examples of the target vehicle speed, the minimum brake/drive force, and the fuel-cut brake/drive force are illustrated in combination. In FIG. 3, these forces are illustrated to have steady values as the example. However, in reality, these forces possibly fluctuate according to operation of the driver assistance system and the state of the powertrain 50. The same processing can be executed even when these values fluctuate.

A period in which time t is T0<t≤T1 corresponds to (1-1) and (1-4) described above. In this period, the powertrain control section 30 causes the powertrain 50 to generate the requested brake/drive force without executing the fuel cut, and the brake control section 40 does not cause the brake 60 to generate the brake force.

A period in which the time t is T1<t<T2 corresponds to (1-1) and (1-3) described above. In this period, the powertrain control section 30 causes the powertrain 50 to generate the minimum brake/drive force without executing the fuel cut, and the brake control section 40 causes the brake 60 to generate the brake force corresponding to a difference between the requested brake/drive force and the minimum brake/drive force.

When time at which the time t=T2 corresponds to (1-2) and (1-4) described above. At this time, the powertrain control section 30 causes the powertrain 50 to execute the fuel cut and thereby generate the fuel-cut brake/drive force, and the brake control section 40 does not cause the brake 60 to generate the brake force.

A period in which the time t is T2<t corresponds to (1-2) and (1-3) described above. In this period, the powertrain control section 30 causes the powertrain 50 to execute the fuel cut and thereby generate the fuel-cut brake/drive force, and the brake control section 40 causes the brake 60 to generate the brake force corresponding to a difference between the requested brake/drive force and the fuel-cut brake/drive force.

As it has been described so far, in this embodiment, the powertrain 50 and the brake 60 are cooperatively operated. As a result, the brake/drive force generated in the vehicle can preferably match the requested brake/drive force.

(Second Embodiment) In the brake/drive force control system 1 according to the first embodiment, the powertrain control section 30 determines the brake/drive force to be generated by the powertrain 50. Meanwhile, a brake/drive force control system 1 according to a second embodiment of the disclosure has the same configuration as the brake/drive force control system 1 according to the first embodiment, but differs therefrom in a point that the brake/drive force control section 20 determines the brake/drive force to be generated by the powertrain 50.

Figure 4:
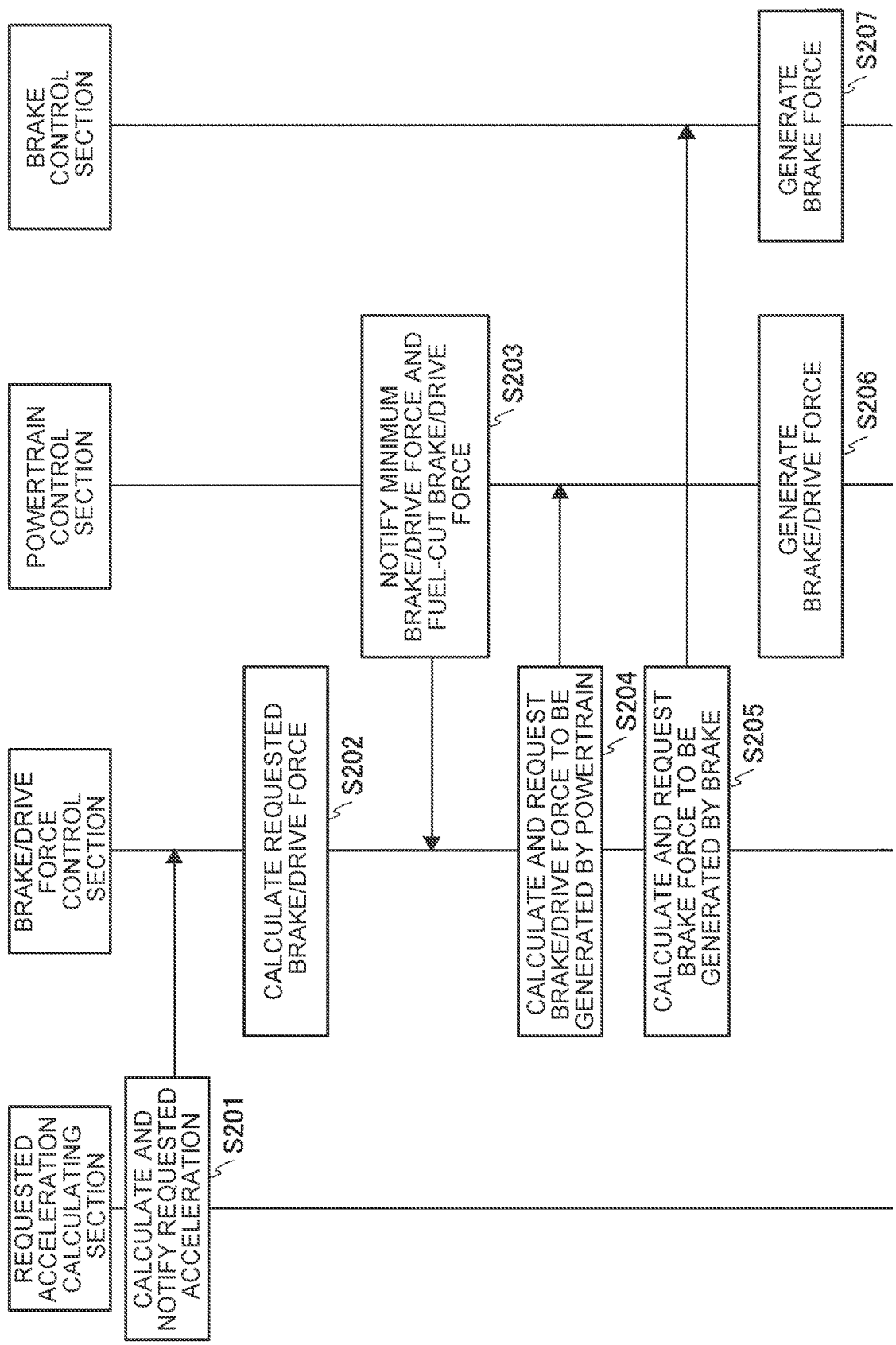
FIG. 4 is a sequence chart illustrating processing according to the second embodiment of the disclosure.

<Processing> FIG. 4 is a sequence chart illustrating an example of the brake/drive force control processing executed by the brake/drive force control system 1. A description will be made on the example of the brake/drive force control processing with reference to FIG. 4. The same items as those in the first embodiment will not be described or briefly be described.

(Step S201): The requested acceleration calculating section 10 calculates the requested acceleration and notifies the brake/drive force control section 20 of the requested acceleration.

(Step S202): The brake/drive force calculating section 21 of the brake/drive force control section 20 calculates the requested brake/drive force on the basis of the requested acceleration.

(Step S203): The powertrain control section 30 calculates the minimum brake/drive force and the fuel-cut brake/drive force, and notifies the brake/drive force control section 20 of the minimum brake/drive force and the fuel-cut brake/drive force. The processing in this step is processing that is periodically executed by the powertrain control section 30, for example. Thus, the brake/drive force control section 20 can always acquire the minimum brake/drive force and the fuel-cut brake/drive force.

(Step S204): On the basis of the requested brake/drive force calculated in step S202 and the minimum brake/drive force and the fuel-cut brake/drive force notified in step S203, the brake/drive force distributing section 22 of the brake/drive force control section 20 determines the brake/drive force to be generated by the powertrain 50 as follows, and requests the powertrain control section 30 for the brake/drive force.

(2-1) When the requested brake/drive force is equal to or larger than the minimum brake/drive force: the brake/drive force distributing section 22 requests the powertrain control section 30 for the requested brake/drive force.

(2-2) When the requested brake/drive force is smaller than the minimum brake/drive force and is larger than the fuel-cut brake/drive force: the brake/drive force distributing section 22 requests the powertrain control section 30 for the minimum brake/drive force.

(2-3) When the requested brake/drive force is equal to or smaller than the fuel-cut brake/drive force: the brake/drive force distributing section 22 requests the powertrain control section 30 for the fuel-cut brake/drive force.

(Step S205): On the basis of the requested brake/drive force calculated in step S202 and the minimum brake/drive force and the fuel-cut brake/drive force notified in step S203, the brake/drive force distributing section 22 of the brake/drive force control section 20 determines the brake force to be generated by the brake 60 as follows. In the case where the brake force is generated, the brake/drive force distributing section 22 requests the brake control section 40 for the determined brake force.

(2-4) When the requested brake/drive force is equal to or larger than the minimum brake/drive force: the brake/drive force distributing section 22 does not request the brake control section 40 to generate the brake force. Alternatively, the brake/drive force distributing section 22 requests the brake control section 40 for 0 (N) as the brake force.

(2-5) When the requested brake/drive force is smaller than the minimum brake/drive force and is larger than the fuel-cut brake/drive force: the brake/drive force distributing section 22 requests the brake control section 40 for the brake force corresponding to the difference between the requested brake/drive force and the minimum brake/drive force.

(2-6) When the requested brake/drive force is equal to or smaller than the fuel-cut brake/drive force: the brake/drive force distributing section 22 requests the brake control section 40 for the brake force corresponding to the difference between the requested brake/drive force and the fuel-cut brake/drive force.

(Step S206): The powertrain control section 30 causes the powertrain 50 to generate the brake/drive force requested in step S204. When the requested brake/drive force is larger than the fuel-cut brake/drive force, the powertrain control section 30 causes the powertrain 50 to generate the requested brake/drive force without executing the fuel cut as a result. Meanwhile, when the requested brake/drive force is equal to or smaller than the fuel-cut brake/drive force, the powertrain control section 30 causes the powertrain 50 to execute the fuel cut and thereby generate the requested brake/drive force as a result.

(Step S207): When being requested to generate the brake force from the brake/drive force control section 20 in step S205, the brake control section 40 causes the brake 60 to generate the requested brake force.

The processing in steps S201 to S207 described so far is repeatedly executed. A result of the brake/drive force control by the processing described so far is the same as that in the first embodiment. In order to describe such a result of the brake/drive force control in the second embodiment, a description will be made on an example of the brake/drive force control by the processing in this embodiment with reference to FIG. 3.

The period in which the time t is $0<t\leq T1$ corresponds to (2-1) and (2-4) described above. In this period, the powertrain control section 30 causes the powertrain 50 to generate the requested brake/drive force without executing the fuel cut, and the brake control section 40 does not cause the brake 60 to generate the brake force.

The period in which the time t is $T1<t<T2$ corresponds to (2-2) and (2-5) described above. In this period, the powertrain control section 30 causes the powertrain 50 to generate the minimum brake/drive force without executing the fuel cut, and the brake control section 40 causes the brake 60 to generate the brake force corresponding to the difference between the requested brake/drive force and the minimum brake/drive force.

When the time at which the time $t=T2$ corresponds to (2-3) and (2-6) described above. At this time, the powertrain control section 30 causes the powertrain 50 to execute the fuel cut and thereby generate the fuel-cut brake/drive force. In this case, the brake force corresponding to the difference between the requested brake/drive force and the fuel-cut brake/drive force is 0 (N). Thus, the brake control section 40 does not cause the brake 60 to generate the brake force.

The period in which the time t is $T2<t$ corresponds to (2-3) and (2-6) described above. In this period, the powertrain control section 30 causes the powertrain 50 to execute the fuel cut and thereby generate the fuel-cut brake/drive force, and the brake control section 40 causes the brake 60 to generate the brake force corresponding to the difference between the requested brake/drive force and the fuel-cut brake/drive force.

As it has been described so far, also in this embodiment, similar to the first embodiment, the powertrain 50 and the brake 60 are cooperatively operated. As a result, the brake/drive force generated in the vehicle can preferably match the requested brake/drive force.

(Effects) According to each of the embodiments of the disclosure, in the case where the requested brake/drive force is smaller than the drive force generated by the powertrain at the time of no fuel cut, but is larger than the brake/drive force generated by the powertrain during the execution of the fuel cut, the fuel cut is suppressed. In addition, in the case where the requested brake/drive force is in such a range that cannot be generated only by the powertrain at the time of no fuel cut and during the execution of the fuel cut, the brake is made to generate the brake force, so as to match the brake/drive force generated in the vehicle with the requested brake/drive force. In this way, the brake/drive force generated in the vehicle does not deviate from the requested brake/drive force for maintaining the target vehicle speed, and is not changed discontinuously due to the fuel cut. Therefore, the preferred pursuance to the target vehicle speed and the preferred ride quality without the abrupt change in the brake/drive force can be achieved.

The description has been made so far on the embodiments of the disclosure. However, the disclosure is not limited to the brake/drive force control system but can be understood to include a control method executed by each component of the brake/drive force control system and a computer in each of the components, a control program, a non-transitory computer readable recording medium storing the control program, the vehicle on which the brake/drive force control system is mounted, and the like.

The disclosure is useful for a brake/drive force system mounted on the vehicle and the like.

What is claimed is:

1. A brake/drive force control system that controls a brake/drive force so as to maintain a target vehicle speed, the brake/drive force control system comprising:
    a powertrain control section that calculates a minimum brake/drive force that is a minimum brake/drive force capable of being generated by a powertrain without executing a fuel cut of an engine, and a fuel-cut brake/drive force that is the brake/drive force generated by the powertrain through execution of the fuel cut, accepts a request to generate the brake/drive force, and causes the powertrain to generate the brake/drive force based on the minimum brake/drive force, the fuel-cut brake/drive force, and the requested brake/drive force.

2. The brake/drive force control system according to claim 1, wherein the powertrain control section causes the powertrain to generate larger one of the requested brake/drive force and the minimum brake/drive force when the requested brake/drive force is larger than the fuel-cut brake/drive force, and causes the powertrain to generate the fuel-cut brake/drive force when the requested brake/drive force is equal to or smaller than the fuel-cut brake/drive force.

3. The brake/drive force control system according to claim 1, wherein:
    the brake/drive force control system controls the brake/drive force to be generated by the powertrain including the engine and a brake force to be generated by a brake, so as to maintain the target vehicle speed,
    the brake/drive force control system further includes
      a requested acceleration calculating section that calculates requested acceleration as acceleration generated in a vehicle to maintain the target vehicle speed,
      a brake control section that accepts a request to generate the brake force and causes the brake to generate the requested brake force, and
      a brake/drive force control section that requests the powertrain control section for the brake/drive force and requests the brake control section for the brake force based on the requested acceleration, and
    the brake/drive force control section includes:
      a brake/drive force calculating section that calculates the requested brake/drive force acquired by converting the requested acceleration to a force, and
      a brake/drive force distributing section that requests the powertrain control section for the requested brake/drive force, acquires the brake/drive force that is generated by the powertrain in response to the request, and requests the brake control section for the brake force corresponding to a difference between the requested brake/drive force and the acquired brake/drive force when the requested brake/drive force is smaller than the acquired brake/drive force.

4. A vehicle comprising the brake/drive force control system according to claim 1.

5. A brake/drive force control system that controls a brake/drive force so as to maintain a target vehicle speed, the brake/drive force control system comprising:

a brake/drive force control section that requests a powertrain control section for the brake/drive force, wherein
the brake/drive force control section includes a brake/drive force request section that:
acquires (a) a minimum brake/drive force that is a minimum brake/drive force capable of being generated by a powertrain without executing a fuel cut of an engine, and (b) a fuel-cut brake/drive force that is the brake/drive force generated by the powertrain through execution of the fuel cut, and
requests the powertrain control section for the brake/drive force based on the minimum brake/drive force, the fuel-cut brake/drive force, and a requested brake/drive force.

6. The brake/drive force control system according to claim 5, wherein:
when the requested brake/drive force is equal to or larger than the minimum brake/drive force, the brake/drive force request section requests the powertrain control section for the requested brake/drive force;
when the requested brake/drive force is smaller than the minimum brake/drive force and is larger than the fuel-cut brake/drive force, the brake/drive force request section requests the powertrain for the minimum brake/drive force, and requests a brake control section for a brake force corresponding to a difference between the requested brake/drive force and the minimum brake/drive force; and
when the requested brake/drive force is equal to or smaller than the fuel-cut brake/drive force, the brake/drive force request section requests the powertrain for the fuel-cut brake/drive force, and requests the brake control section for the brake force corresponding to a difference between the requested brake/drive force and the fuel-cut brake/drive force.

7. The brake/drive force control system according to claim 5, wherein:
the brake/drive force control system controls the brake/drive force to be generated by the powertrain including the engine and a brake force to be generated by a brake, so as to maintain the target vehicle speed;
the brake/drive force control system further includes
a requested acceleration calculating section that calculates requested acceleration as acceleration generated in a vehicle to maintain the target vehicle speed,
the powertrain control section that calculates the minimum brake/drive force and the fuel-cut brake/drive force, accepts a request to generate the brake/drive force, and causes generation of the requested brake/drive force, and
a brake control section that accepts a request to generate the brake force and causes the brake to generate the requested brake force; and
the brake/drive force control section further includes a brake/drive force calculating section that calculates the requested brake/drive force acquired by converting the requested acceleration to a force.

8. A vehicle comprising the brake/drive force control system according to claim 5.

9. A powertrain that controls a brake/drive force so as to maintain a target vehicle speed, the powertrain comprising:
a powertrain control section that calculates a minimum brake/drive force that is a minimum brake/drive force capable of being generated without executing a fuel cut of an engine, and a fuel-cut brake/drive force that is the brake/drive force generated through execution of the fuel cut, accepts a request to generate the brake/drive force, and causes the powertrain to generate the brake/drive force based on the requested brake/drive force, the minimum brake/drive force, and the fuel-cut brake/drive force.

10. A vehicle comprising the powertrain according to claim 9.

* * * * *